United States Patent [19]  [11] Patent Number: 4,930,043
Wiegand  [45] Date of Patent: May 29, 1990

[54] CLOSED-LOOP CAPACITIVE ACCELEROMETER WITH SPRING CONSTRAINT

[75] Inventor: Walter J. Wiegand, Glastonbury, Conn.

[73] Assignee: United Technologies, Hartford, Conn.

[21] Appl. No.: 317,238

[22] Filed: Feb. 28, 1989

[51] Int. Cl.$^5$ .......................... G01P 15/02; H01G 7/00
[52] U.S. Cl. .................................. 361/283; 73/517 AV
[58] Field of Search .................. 361/283; 73/505, 510, 73/517 R, 517 AV, 517 B

[56] References Cited

U.S. PATENT DOCUMENTS

| 4,244,225 | 1/1981 | Greenwood | 73/517 AV |
| 4,574,327 | 3/1986 | Wilner | 361/283 |
| 4,609,968 | 9/1986 | Wilner | 361/320 |
| 4,658,647 | 4/1987 | Shintani et al. | 73/517 B |
| 4,679,434 | 7/1987 | Stewart | 73/517 B |
| 4,699,006 | 10/1987 | Boxenhorn | 73/517 |

FOREIGN PATENT DOCUMENTS

| 2130372 | 5/1984 | United Kingdom . |
| 2130373 | 5/1984 | United Kingdom . |
| 2158945 | 5/1984 | United Kingdom . |

Primary Examiner—Donald A. Griffin
Attorney, Agent, or Firm—Eric W. Petraske

[57] ABSTRACT

A micromachined three-plate capacitive accelerometer incorporates hinges attached to top and bottom surfaces of the proof mass that are symmetric about X and Y axes and also about diagonal axes; passageways for gas film damping in the fixed members that do not affect the capacitance to any significant degree; and provision for independently selecting two of the parameters sensitivity, capacitance and maximum acceleration.

3 Claims, 2 Drawing Sheets

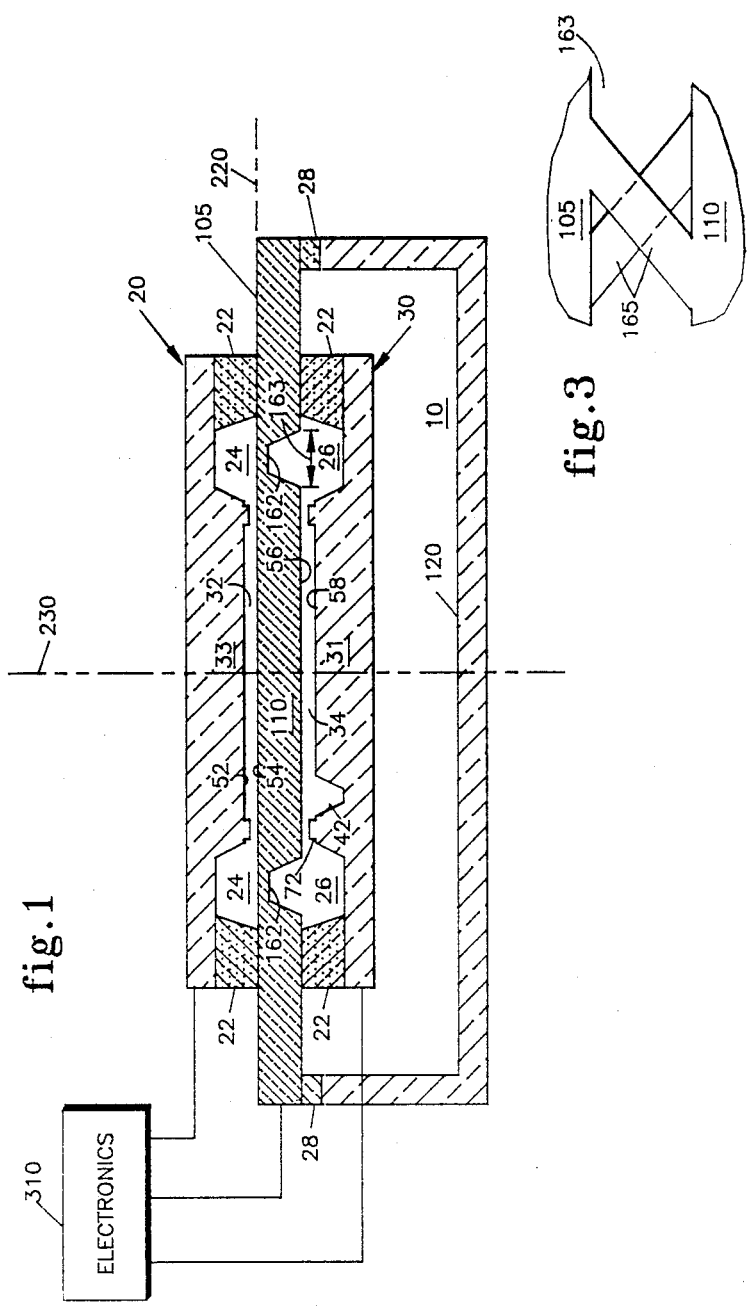

CLOSED-LOOP CAPACITIVE ACCELEROMETER WITH SPRING CONSTRAINT

RELATED APPLICATIONS

This invention is related to inventions disclosed in commonly owned copending applications, Ser. Nos. 317240, 317309, 317239, 317258, 317237, 317217, filed contemporaneously herewith.

TECHNICAL FIELD

This invention relates to solid state accelerometers micro-machined from silicon.

BACKGROUND ART

In the field of accelerometers, it is known to form a small compact accelerometer by etching the relevant parts out of silicon. U.S. Pat. No. 4,574,327 illustrates one version of such a transducer in which a proof mass having a textured surface containing many grooves and apertures extending through the proof mass has its surface tailored in order to achieve the desired frequency response by using the squeeze-film damping phenomenon. In that apparatus, response is hindered by the fact that the surface of the proof mass is corrugated and is not uniform so that the capacitance is much less than it would be if the surface were smooth. Further, the removal of a substantial portion of mass limits the amount of mass available and thereby decreases the sensitivity of the accelerometer.

It is known in the art to form a closed-loop accelerometer, in which the proof mass is electrically urged to a reference position and the voltage or current required for restoration is a measure of the acceleration. One such closed-loop system is shown in U. S. Pat. No. 4,649,748.

Closed-loop micromachined accelerometers in the art have soft springs or hinges because, when the proof mass is in the nominal position, the springs do not exert any force.

The problems evidenced by such prior art devices are the difficulty of tailoring the parameters of the device to accommodate different ranges of acceleration to be measured and the different ranges of frequency response of the device. In a typical design, the mechanical, damping and electrical parameters are interrelated so that changing one parameter will have an adverse affect on others.

DISCLOSURE OF INVENTION

The invention relates to an improved closed-loop capacitive accelerometer in which a three-plate capacitor is formed with the proof mass being the central plate and the spring constant of the retaining hinges is constrained within predetermined limits dependent on the maximum acceleration to be measured and the acceleration causing maximum deflection of the proof mass.

Other features and advantages will be apparent from the specification and claims and from the accompanying drawings which illustrate an embodiment of the invention.

BRIEF DESCRIPTION OF DRAWINGS

FIG. 1 illustrates in cross section an embodiment of the invention.

FIG. 3 illustrates a plan view of an alternate version of flexures usable together with the invention.

BEST MODE FOR CARRYING OUT THE INVENTION

Figure 4A:
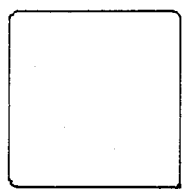
FIG. 4 illustrates different shapes of proof mass usable in the invention.

Referring now to FIG. 1, there is shown in cross section an embodiment of the invention adapted to register acceleration coaxial with an axis 230 extending upwardly through the drawing. For clarity, the vertical dimensions are greatly exaggerated. Electrically, the apparatus is a three-plate capacitor in which top and bottom plates 20 and 30 respectively are formed of rigid silicon members that are bonded to an intermediate silicon frame 105 that contains a proof mass 110. Bonding, by means of standard anodic or thermal methods, is between frame 105 and glass borders 22 formed on the top and bottom plates 20 and 30 using standard glass deposition and etching techniques.

Figure 2:
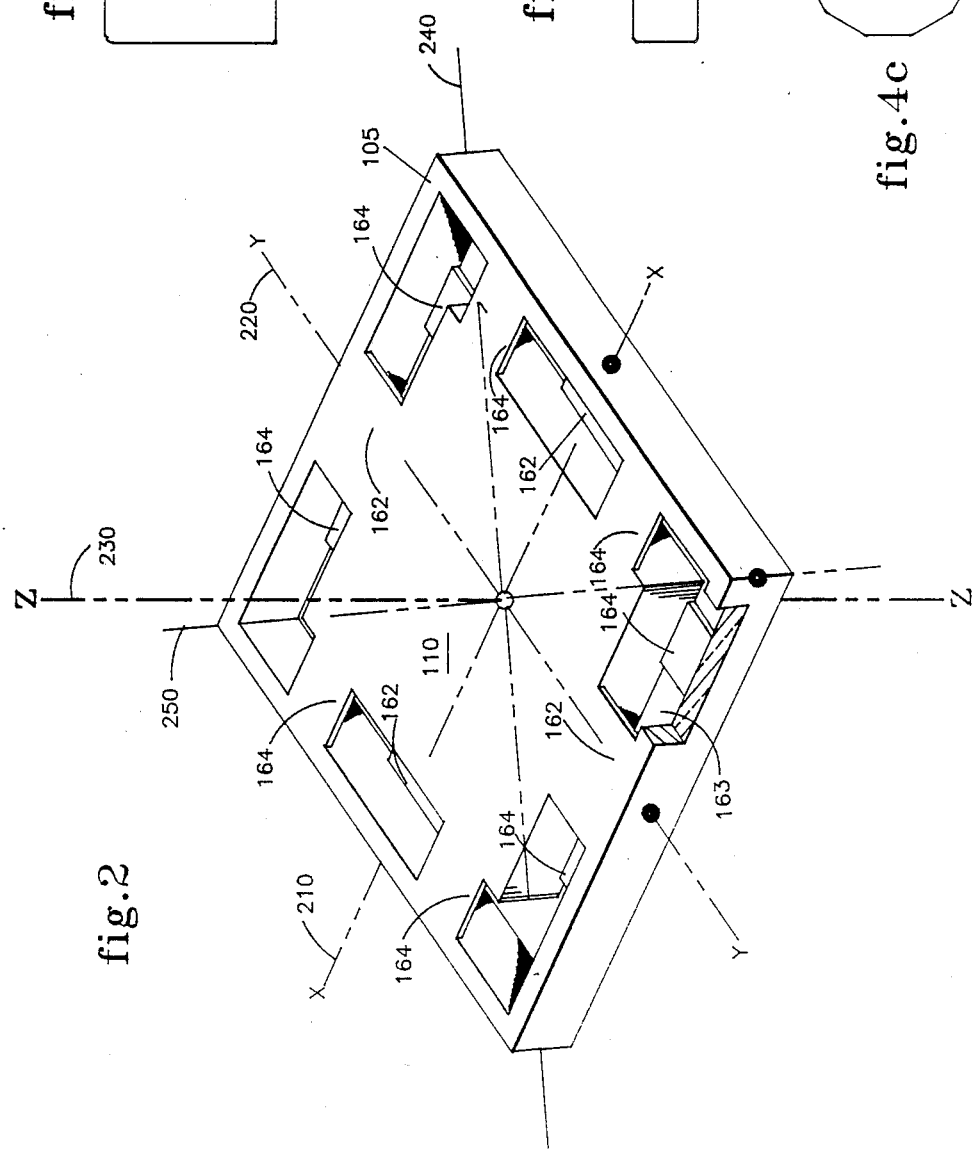
FIG. 2 illustrates in perspective a proof mass constructed to the invention.

Differences between prior art three-plate capacitor arrangements and that of the present invention may be illustrated conveniently with respect to FIG. 2, showing frame 105 and proof mass 110 in simplified perspective. The same axis 230 is the Z axis in this drawing with corresponding X axis 210 and Y axis 220 which lie an the midplane of the proof mass and pass through its centroid. Proof mass 110 is surrounded by a gap 163 formed by anisotropic etching, illustratively EDP etching. An important distinction between prior art arrangements and the present invention is that of the layout of the flexures, or hinges, which couple proof mass 110 to frame 105. Looking along Y axis 220, it can be seen that there is a relatively large flexure 162 in the top plane at both the top and bottom of the drawing. On the bottom surface of proof mass 110, there is a pair of smaller flexures 164 disposed symmetrically about Y axis 220, each having half the width of flexure 162, so that the total stiffness of the flexures on the top and bottom surface is the same. Also, on the lower portion of gap 163 on the opposite side of the proof mass, there is a symmetric arrangement of corresponding flexures 162 and 164. Thus, not only is the top and bottom of the arrangement symmetric about axis 220, but also it is symmetric about X axis 210 since there is a balance on the top and bottom of the drawing.

On the left and right of the drawing, there is a corresponding symmetric arrangement of flexures 164 and 162 that differs from the top and bottom sides in that the smaller flexures 164 are on the top surface and the larger one, 162, is on the bottom surface. The importance of this arrangement can be seen by looking at axes 240 and 250, respectively, which extend along the diagonals of the square proof mass 110 midplane. Looking at axis 240, for example, there is a flexure 164 on the bottom surface of proof mass 110 on the left and a corresponding flexure 164 on the top surface on the right. This would induce a slight torque about axis 240 but that is balanced by corresponding flexures 162 on the bottom right and top left, respectively. Similarly, about axis 250, there is a corresponding top/bottom matching of flexures, both flexures being spaced equally from the corner. For purposes of this application, the arrangement shown in FIG. 1 will be referred to as being symmetric about the diagonal plane defined by axes 230 and 240, even though corresponding flexures are in opposite top or bottom surfaces of the proof mass.

The flexure layout is not, of course, confined to a three-flexure per side arrangement and many other arrangements relative to widths, numbers and placement of the flexures will be evident to those skilled in the art. Flexures may be placed on the top and bottom surfaces, as shown, or in the midplane of the proof mass. The principle being followed in this embodiment is that of high symmetry about the transverse axes 210 and 220 together with the out of plane symmetry about the diagonal axes 240 and 250.

Figure 4B:
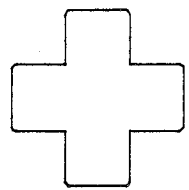
Figure 4C:
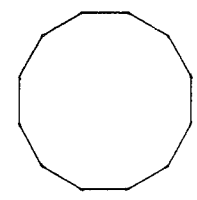

Alternative forms of proof mass 110 are illustrated in FIG. 4A, 4B and 4C. Etching of square corners in silicon is known to those skilled in the art to be possible by various techniques disclosed in the literature, such as "Corner Undercutting in Anisotropically Etched Contours", by M.M. Abou-Zaid, in Journal of the Electrochemical Society, Solid State Science and Technology, September 1984, page 2138. Some expense can be saved by an arrangement such as that in FIG. 4A, in which the corners are permitted to be "faceted" or non-square. FIG. 4B has inside corners, which are square, as well as outside corners and has a longer "lever arm" for the hinges than for the capacitor which would be in the central portion. This may be useful for closed-loop applications. It still preserves the symmetry of the embodiment of FIG. 1 about the X and Y axes and also about the diagonal axes. FIG. 4C shows a 12 sided layout that follows the contours that naturally result from differential etching. It is approximately circular, which aids in preserving the symmetry of the proof mass about the acceleration axis. The 4C embodiment would preferably have springs on four sides, for ease in fabricating consistent hinges of uniform length in the gap between the proof mass and the frame.

In the illustrative embodiment, <100> oriented silicon was the starting material, with the geometry laid out so that the edges are along the <110> directions. Anisotropic etching does not proceed at the same rate in the different crystal planes.

According to the present invention, the flexures 162 and 164 are fabricated by masking and boron doping both top and bottom surfaces of a silicon wafer illustratively 10 mils in thickness such that the limit of $6 \times 10^{19}$ boron atoms per cubic centimeter is reached at the depth corresponding to the desired flexure thickness, illustratively 2 microns. With this arrangement, the boron layers, in the top and bottom surfaces, serve as etch stops for a standard anisotropic etchant, illustratively ethylenediamine pyrocatohol (EDP), so that when gap 163 is etched, the gap is opened until the boron layer is reached which serves as an etch stop in those areas where it exists and the etchant opens the apertures around the gap 163. Preferably, the wafer is etched from both top and bottom at the same time by immersing in a fluid bath.

Referring back to FIG. 1, it can be seen that the cross section is taken through the Y/Z plane showing two of flexures 162 at the top of proof mass 110. Apertures 24 in the top plate 20 and 26 in bottom plate 30 have been opened by any convenient etching method to sharply define the area of the variable capacitors formed by plates 20 and 30 and the proof mass 110 and also to reduce parasitic capacitance. When the proof mass is displaced downward, gas will be forced out of the interplate chambers 32 and 34 into these apertures and into other apertures described below.

It has been found that substantial factors in the temperature and temporal stability of capacitor transducers are the temperature coefficient and the aging characteristics of the glass dielectric 22 which bonds together the several plates of the capacitor. The smaller the bond area and the greater the thickness of the glass dielectric 22 between plates 20 and 30 and the frame 105, the less effect the temperature and aging will have on the capacitance measurement being made. Preferably, the thickness of bonding glass 22 is relatively large compared with the capacitor gap and the horizontal dimension of the bonding glass 22 is relatively small compared with the width of mesa 31. In an illustrative example, the width of mesas 31 and 33 was about 0.150 inch and the width of the glass 22 was about 0.010 inch. Illustratively, the entire arrangement will be enclosed in a hermetically sealed enclosure having a pressure chosen for convenient damping and having a gas volume communicating with apertures 24 and 26 far in excess of the volume of capacitance chambers 32 and 34 plus the apertures 24 and 26.

In operation, as the unit is accelerated upwards along axis 230, the proof mass 110 will drop toward the bottom in the diagram reducing the gap between surfaces 56 and 58 and thus, the gas volume in lower chamber 34. Insulating travel stops 72 are shown as being located at various locations on mesas 31 and 33 in order to prevent the proof mass from coming in contact with either mesa. These stops are illustratively glass coated in order to prevent electrical short circuits when the proof mass touches them and have illustrative dimensions of 0.005 inch in width and 0.4 micron in height, with a glass layer of 0.5 micron in thickness for insulation. The distance between capacitor plates may be controlled conveniently by the thickness of layer 22, so that the nominal capacitance, and thus the sensitivity of the sensor, may be altered without affecting the proof mass.

The squeeze film damping phenomenon is used to control the frequency response of the proof mass. A sample channel or passageway is shown that serves to provide a reservoir to hold displaced gas that is squeezed out from the volume between the plates, denoted by the numeral 42. This channel will be part of a network covering surfaces 58 and 52. As chamber 34 contracts, gas is forced into these reservoirs. The total volume of the gas reservoirs should be considerably greater than the change in volume of gas chamber 34 so that there will be only a small increase in pressure in the reservoirs. Preferably, the ratio is about 10 to 1 or greater and the channels have a width of 0.005" and a depth of 12 microns. Channels 42 are formed by any of the standard silicon processing techniques, such as ion milling or reactive ion etching. Since the passageways are relatively shallow, little additional surface is removed beyond that associated with their width in spite of the non-vertical walls that result from a wet etch process, as illustrated in the figure. In contrast, if the passageways are formed in the proof mass, its much greater thickness (typically 0.01") requires deep trenches in order to form the through holes, thereby removing appreciable mass and surface area. Thus, the surface area effectively available for the capacitor is much reduced, and for a given capacitance the area of the capacitor itself must be larger. With this arrangement of relatively narrow shallow trenches in mesas 31 and 33, the affected area available for the capacitance measurement is maximized and, since the proof mass is not pierced and trenched, maximum inertial mass is retained. These channels 42 communicate with reservoir 26 by extending perpendicular to the plane of the paper and/or in the plane of the paper.

The overall arrangement of upper plate 20, lower plate 30 and frame 105 is supported by a three-dimensional lower frame 120 having a generally U-shaped cross section. It is connected to frame 105 by glass joints 28. An advantage of this method is that the thermal effects of heat conduction or loss to the outside world are entered symmetrically relative to the upper and lower plates. If the device were mounted on lower plate 30, for example, that would usually be at a different temperature from upper plate 20 with consequent thermal stresses and distortion and different temperatures experienced by the glass dielectric capacitors.

For a given surface area, the capacitance of the upper and lower capacitors is set by the gap between the proof mass and the surfaces of the top and bottom plates. This gap, illustratively 2 microns, is determined both by the thickness of glass layers 22 which are deposited across the surface of the wafers and etched away except in predetermined areas and by the heights of mesas 31 and 33. Consequently, the gap can be controlled simply by changing the thickness of glass layer 22, in contrast to other art wherein the gap is set by removing material from the face of the proof mass. It is a further advantageous feature of this invention that the network of damping passageways have minimal impact on the surface areas 52 and 58, and therefore on the capacitance, and being located on the plates 20 and 30 rather than on the proof mass 110 have no effect on the maximum detectable acceleration $G_{max}$. For a given capacitance, the full scale range can be controlled independently by selecting the thickness of the proof mass and by controlling the numbers and the thicknesses of flexures 162 and 164 and their lengths and widths. In the illustrative embodiment, flexures 162 and 164 had a thickness of 2.5 microns and respective widths of 0.066" and 0.033" for gap spacing 163 of 0.010" and a proof mass 110 having a thickness of 0.010" and a mass of 7 milligrams. Since no material is removed from the proof mass to create the damping passageways in this invention, $G_{max}$ is independent of damping characteristics. Further, since the sensitivity is proportional to the ratio of the nominal capacitance to $G_{max}$, two of the three parameters, sensitivity, capacitance and $G_{max}$ can be selected independently with the damping characteristics being virtually independent of these. This is in contrast to prior art designs wherein these parameters are all closely linked together and compromised because of the extensive sculpturing of the proof mass.

Referring now to the method of fabrication, the top and bottom silicon slabs 20 and 30 having a nominal thickness of 0.050" have within them top and bottom mesas referred to by the numerals 33 and 31, respectively. These mesas are formed by repeated oxidation of the areas that will be gas plenums 24 and 26 and that will contain the glass spacers 22, followed by etching to remove the silicon dioxide formed in repeated oxidation. The result of this method is a desirable, tightly controlled mesa area surrounded by extremely smooth surface upon which the glass dielectric is deposited. Further details may be found in copending commonly owned application, Ser. No. 317309, filed on the same day herewith and incorporated by reference herein.

An accelerometer constructed according to the invention with a generally circular cross section and having a nominal diameter of 0.150 inches and a gap thickness of 2 microns has demonstrated resolution to one part in ten thousand with a response frequency from 0 hertz to an adjustable upper limit of several hundred hertz using an open loop configuration. In an alternative embodiment, a closed loop configuration would result in even better performance. The electronic portion of the apparatus is illustrated schematically in box 310. This box contains straight forward circuits which may apply forcing voltages to the electrodes for closed loop operation and also to sense capacitance by monitoring the unbalance of the high frequency bridge circuit of which the three-plate capacitor forms a part. A signal proportional to the external acceleration is derived from the forcing voltages required to return the proof mass to its null position.

Analysis of the moments experienced by the proof mass for small rotation about an in-plane axis through its centroid show that torsionally unstable conditions exist for some combinations of total spring constant of the flexures, K, and total applied voltage to both capacitors, $V_t$. If the proof mass is tilted, either by the fabrication process, or by a vibration, there will be a torque tending to pull the proof mass up until it touches the closer capacitor plate. The derivative of electrostatic torque with displacement or tilt angle is positive, since it depends on the square of the voltage.

In order to avoid such an instability in closed-loop operation, the restoring torques due to hinge deflections must overcome the electrostatic torques experienced by a proof mass that is not parallel to the plane defined by the surface of either mesa. The condition derived from the spring constant on the restoring voltages is that the voltage required to bring the proof mass back from contact with the travel stops, $V_{null}$, be greater than the maximum voltage times a numerical factor, N; i.e., $V_{null} > N*V_t$, where N is of the order one, typically between ½ and 2 depending on the geometry and stiffness of the hinges and the shape of the proof mass, and $V_t$ is the maximum voltage available to be applied to the capacitor plates. The particular value of N will depend on the shape of the proof mass and the location and stiffness of the hinges and may readily be calculated by those skilled in the art using the condition that the spring constant be able to overcome the electrical torque produced by misaligned capacitor plates. Small values of N are associated with a geometry in which the capacitor area is smaller than the proof mass, so that the torque exerted by the flexures has a larger lever arm than the electrostatic torque.

Since the maximum voltage will determine the maximum acceleration that can be measured with the device, the condition can be reexpressed as $G_{bottom}/N^2 = G_{max}$, where $G_{max}$ is the maximum acceleration that can be measured with the instrument and $G_{bottom}$ is the acceleration that will drive the proof mass in contact with the travel stops. Closed-loop accelerometers readily can be designed which will satisfy this stability constraint, which, when allowing for the numerical range given above, becomes:

$G_{bottom}/4 < G_{max} < 4G_{bottom}$. The art customarily considers that the stiffness of the hinges in closed-loop accelerometers is not important. It can be seen, however, that the flexures may not be too soft and that there is a constraint on the sensitivity of the device. The sensitivity is close to the nominal capacitance divided by the acceleration that will force the proof mass down to the stops (about 3pf/G with this technology). Depending on design choices, then, the maximum acceleration that can be measured may be only one quarter of the acceleration that one would think of as the maximum.

Referring now to FIG. 3, there is shown an alternative layout for the flexures. In this drawing, which is a plan view of a portion of frame 105 and proof mass 110, there are two diagonal flexures, both referred to by the numeral 165, crossing gap 163. The angle of these flexures with the straight edges of frame 105 and proof mass 110 and their width and length is such that the right hand edge of the upper flexure 165 intersects proof mass 110 to the left of the point where the left hand edge of the same flexure intersects frame 105. The lower flexure has a similar displacement condition. Under these conditions, a wet etch in EDP will selectively undercut both Boron doped flexures leaving a gap in the space between them.

It should be understood that the invention is not limited to the particular embodiments shown and described herein, but that various changes and modifications may be made without departing from the spirit and scope of this novel concept as defined by the following claims.

What is claimed is:

1. A solid-state accelerometer for closed-loop operation to measure acceleration up to a predetermined maximum acceleration comprising:

a three-plate capacitor including fixed top and bottom plates and a movable sensing plate having a predetermined proof mass having a top surface separated from said top plate by a top gap and a bottom surface separated from said bottom plate by a bottom gap, defining a reference plane symmetrically disposed between said top and bottom surfaces and also defining top and bottom capacitors, and being connected to support members by flexible connections extending across a support gap between said reference plate and said support members to move between said top and bottom plates in response to acceleration along an acceleration axis perpendicular to said reference plane, whereby acceleration along said acceleration axis displaces said sensing plate from said reference plane and alters the capacitance in said top and bottom capacitors, in which;

said top and bottom plates and said support members are bonded together to form a rigid structure;

said sensing plate is connected to said support members by at least two flexures extending a predetermined hinge length, less than the length of said sensing plate, along opposite sides of said sensing plate and having a predetermined hinge thickness to determine a total spring constant, whereby that a communication path is established between a top chamber between said top plate and said sensing plate and a bottom chamber between said bottom plate and said sensing plate;

at least one of said top and bottom chambers has motion stops disposed therein whereby said sensing plate may be displaced from said reference plane by less than a predetermined maximum displacement along said acceleration axis; and electronics means for sensing displacement of said sensing plate from said reference plane and applying voltage to said three-plate capacitor to restore said sensing plate to said reference plane, characterized in that:

$G_{max}$ said maximum acceleration to be measured, and $G_{bottom}$, the acceleration that will cause the sensing plate to contact said motion stops, are related by the condition $G_{bottom}/4 < G_{max} < 4 G_{bottom}$, $G_{bottom}$ being a function of said total spring constant of said flexible connections, whereby said maximum acceleration to be measured is limited by said total spring constant.

2. An accelerometer according to claim 1 further characterized in that $V_{null}$, the voltage required to return said sensing plate to said reference plane from contact with said motion stops, is related to $V_t$, the sum of the voltage applied to said top and bottom capacitors, by the condition $V_{null} > N*V_t$, where N is a constant having a value between ½ and 2.

3. An accelerometer according to claim 1 further characterized in that the area of said top and bottom capacitors are substantially the same as the area of said proof mass and said condition is $G_{bottom}/4 < G_{max} < G_{bottom}$.

* * * * *